United States Patent [19]

Ninomiya

[11] Patent Number: 5,332,993
[45] Date of Patent: Jul. 26, 1994

[54] POWER CONTROLLING APPARATUS WITH A POWER FAILURE DETECTING FUNCTION

[75] Inventor: Ryozi Ninomiya, Tokyo, Japan

[73] Assignee: Kabushiki Kaisha Toshiba, Kawasaki, Japan

[21] Appl. No.: 784,710

[22] Filed: Oct. 30, 1991

[30] Foreign Application Priority Data

Nov. 7, 1990 [JP] Japan .................................. 2-301690

[51] Int. Cl.⁵ .............................................. G08B 21/00
[52] U.S. Cl. ..................................... 340/635; 340/636; 320/48
[58] Field of Search .................. 340/636, 635; 320/48; 364/482, 483; 324/425, 426, 431, 433

[56] References Cited

U.S. PATENT DOCUMENTS

| | | | |
|---|---|---|---|
| 3,940,679 | 2/1976 | Brandwein et al. | 320/48 |
| 4,307,389 | 12/1981 | Slotkowski | 340/661 |
| 4,553,081 | 11/1985 | Koenck | 340/636 X |
| 4,600,962 | 7/1986 | Bliehall | 361/77 |

FOREIGN PATENT DOCUMENTS 2074406 10/1981 United Kingdom .

OTHER PUBLICATIONS

Toshiba User's Manual, "T1600 Portable Personal Computer" Sep. 1988.
Toshiba Reference Manual, "T2000SX Portable Personal Computer" Nov. 1990.

*Primary Examiner*—Jeffery A. Hofsass
*Attorney, Agent, or Firm*—Oblon, Spivak, McClelland, Maier & Neustadt

[57] ABSTRACT

A CPU in a power source controller generates various error status data, that correspond to various kinds of failure conditions, based on detection signals supplied from a variety of failure detection circuits provided at a power source circuit. The CPU controls an LED in a blinker based on the error status data to light up and extinguish the LED in an orderly fashion which is fixed by the generated data, so that the blinker blinks variously in correspondence with various kinds of power failure conditions. Thus, a various kinds of power failure conditions can be indicated by difference in blinking operation of the blinker.

7 Claims, 10 Drawing Sheets

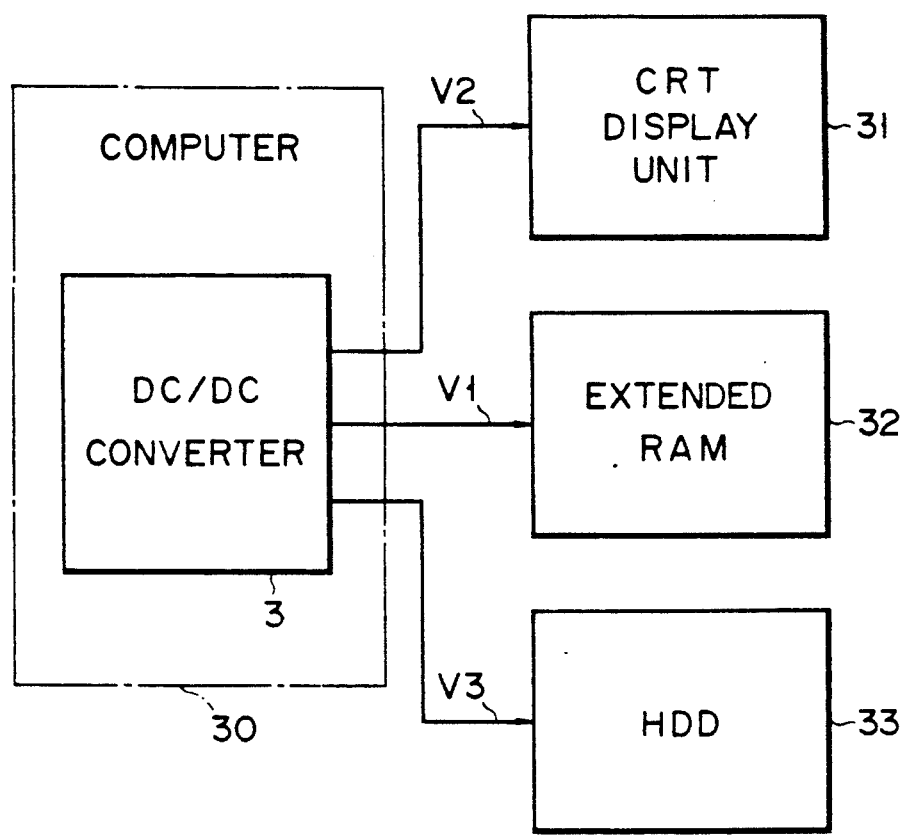
F I G. 13

POWER CONTROLLING APPARATUS WITH A POWER FAILURE DETECTING FUNCTION

BACKGROUND OF THE INVENTION

Field of the Invention

The present invention relates to a power controlling apparatus for detecting a power failure of a power source circuit, which is used in an electronic equipment such as a personal computer, and displaying detected results.

Description of the Related Art

Hitherto an electronic equipment such as a personal computer uses as its power source a commercially available alternating current source (an AC source) or a chargeable battery (a chargeable internal battery). It uses a DC/DC converter, etc., to generate various direct currents, each having its own necessary voltage level (a DC voltage), from the power source circuit which uses either one of the above-mentioned power sources and to provide the currents thus obtained to the various circuits in the electronic equipment.

The electronic equipment has a device which detects an occurrence of a power failure at the power source circuit and notifies an operator of the power failure. Such a device monitors an output voltage level of the power source circuit and causes a warning device having a light emitting diode, etc., to light up when the detected voltage level is outside an allowable range.

The above electronic equipment may surely notify the operator of the occurrence of a power failure in the power source circuit by lighting up the display device, but it cannot notify the operator of a particular part of the power source circuit which is in failure or details of the failure. For instance, it is impossible for the operator to determine from the information of the warning device whether the failure in question occurs in the AC power source circuit or the battery. Furthermore, if the failure in the power source circuit occurs due to the variation in temperature around the electronic equipment, the operator cannot find the cause of the failure.

Accordingly, upon repair of the power source circuit, the whole of the power source circuit must be examined thoroughly to find out a failure part or a failure cause. This means that a laborious complicated checking work must be done to repair the power source circuit and to restore the electronic equipment to the original normal condition.

SUMMARY OF THE INVENTION

The object of the present invention is to realize a power controlling apparatus which surely detects an occurrence of a power failure in a power source circuit used in an electronic equipment such as a personal computer and notifies an operator of details of the detected power source failure, such as a failed portion or a failure cause.

To achieve the above object, the present invention provides a power controlling apparatus comprising:

detecting means for outputting a failure detection signal upon detecting that a power source circuit is in a failure condition;

failure data processing means for identifying the failure condition of the power source circuit based on the failure detection signal from the detecting means, and generating a failure status data that fits to the power failure conditions of the identified kind; and blinker means for blinking in a variety of fashions in correspondence with various kinds of power failure conditions based on the failure status data generated by the failure data processing means.

Upon detection of the power source circuit being in a failure condition, the apparatus in the present invention visually notifies an operator of the kind of the failure, such as a failure portion or a failure cause, by blinking in an orderly fashion which fits to power failure conditions of the detected kind.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 13 is a block diagram showing that the power source circuit in accordance with the above embodiment of the present invention is provided at a personal computer.

DETAILED DESCRIPTION OF THE PREFERRED EMBODIMENTS

Now, one embodiment of the present invention will be explained below with reference to the drawings.

Figure 1:
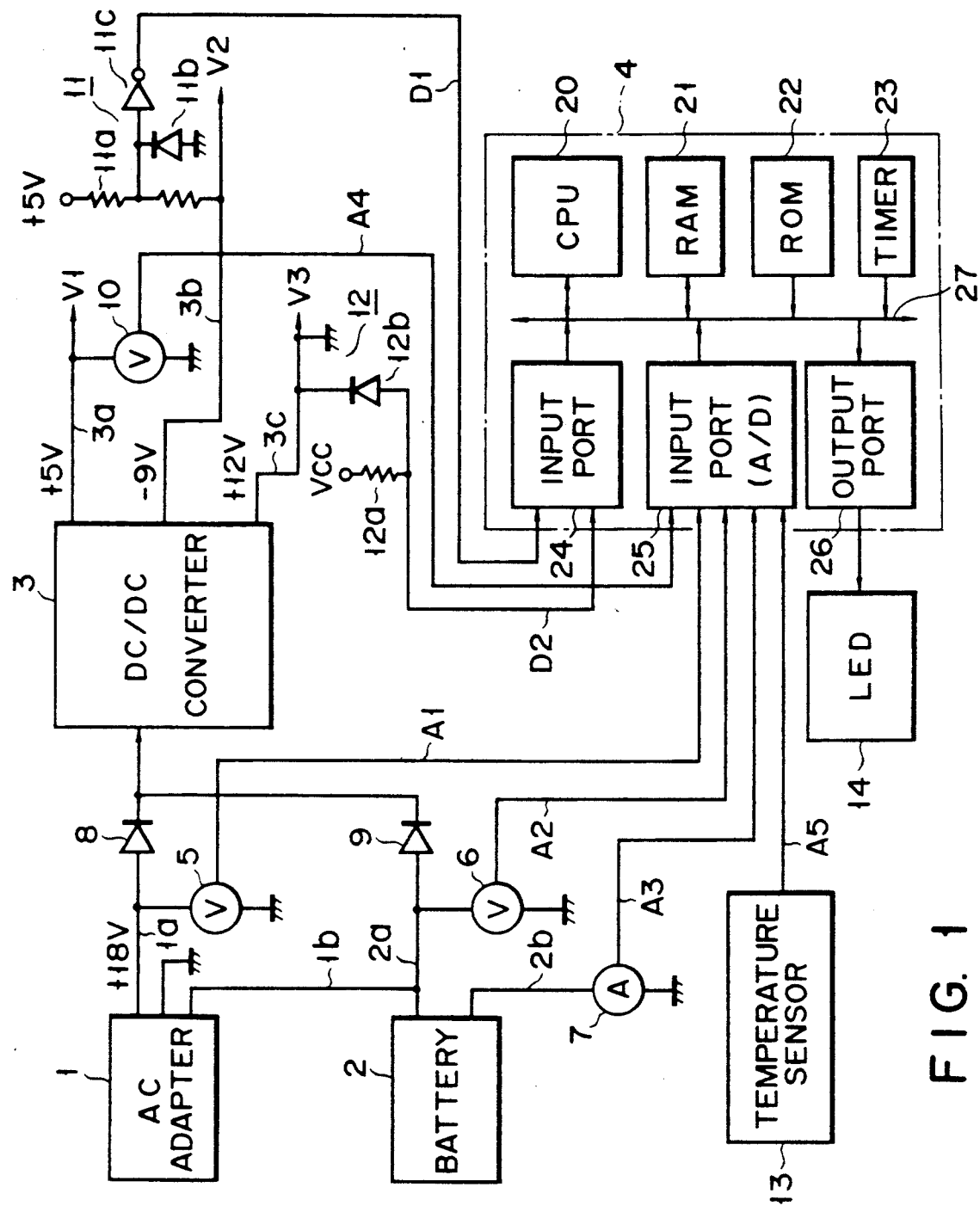
FIG. 1 is a block diagram showing a structure of a power source system in accordance with one embodiment of the present invention.

FIG. 1 is a block diagram for explaining a power source system in accordance with one embodiment of the present invention. This power source system is used in a personal computer, for instance, and comprises a power source circuit and a power source controller.

The power source circuit has, as shown in FIG. 1, AC adapter 1, battery 2, and DC/DC converter 3. AC adapter 1 is connected with a commercially available alternating current source, and puts out through output terminal 1a a direct current having a voltage of, for instance, +18 V. Output terminal 1a is connected with voltage detector 5. Voltage detector 5 detects a voltage of output terminal 1a and puts out detected result A1 (a voltage level value).

Battery 2 is connected with output terminal 1b of AC adapter 1, and is charged by a charging output power from AC adapter 1. Battery 2 puts out through output terminal 2a a direct current having a voltage of, for instance, +18 V. Output terminal 2a is connected with voltage detector 6. Voltage detector 6 detects a voltage of output terminal 2a (including charged voltage), and puts out detected result A2 (a voltage level value). Current detector 7 is connected with output terminal 2b of battery 2. It detects the charged current of battery 2, and puts out detected result A3 (a current level value).

DC/DC converter 3 receives a direct current voltage supplied from output terminal 1a of AC adapter 1 through reverse current preventing diode 8, or a direct current voltage supplied from output terminal 2a of battery 2 through reverse current preventing diode 9. DC/DC converter 3 converts the input voltage from AC adapter 1 or battery 2 into various direct current voltages, for instance, +5 V output voltage V1, −9 V output voltage V2, and +12 V output voltage V3, and they are respectively put out through output terminals 3a, 3b, and 3c.

The power source circuit including DC/DC converter 3 is provided within personal computer 30 as shown in FIG. 13. Computer 30 is connected with various peripheral units such as CRT display unit 31, extended RAM 32, and hard disk drive unit (HDD) 33. DC/DC converter 3 supplies output voltage V1 from output terminal 3a to extended RAM 32, output voltage V2 from output voltage 3b to CRT display unit 31, and output voltage V3 from output terminal 3c to HDD 33.

Voltage detector 10 is connected with output terminal 3a of DC/DC converter 3, detects output voltage V1, and puts out detected result A4 (a voltage level value).

DC/DC converter 3 has output terminals 3b and 3c which are respectively connected with short-circuit detectors 11 and 12. Short-circuit detector 11 connected with output terminal 3b comprises resistance circuit 11a, diode 11b, and inverter 11c. When short-circuit detector 11 detects that a short-circuit is produced at output terminal 3b, it puts out detection signal D1 having a low level. In contrast, when output terminal 3b is in a normal condition, output signal D1 put out of short-circuit detector 11 is in a high level. Short-circuit detector 12 connected with output terminal 3c comprises resistance circuit 12a and diode 12b. Short-circuit detector 12 puts out detection signal D2 having a low level when a short-circuit is produced at output terminal 3c. In contrast, when output terminal 3c is in a normal condition, output signal D2 put out of short-circuit detector 12 is in a high level.

Temperature sensor 13 is provided near the power source circuit comprising AC adapter 1, battery 2, and DC/DC converter 3. Temperature sensor 13 detects an ambient temperature and puts out detection result A5 (a voltage level value corresponding to the temperature value).

Power source controller 4 concerns a gist of the present invention, and performs an operation of detecting an occurrence of a power failure in the power source circuit having the above structure. Power source controller 4 has micro-processor (CPU) 20, random access memory (RAM) 21, read only memory (ROM) 22, timer 23, a first input port 24, and a second input port 25.

Figure 3:
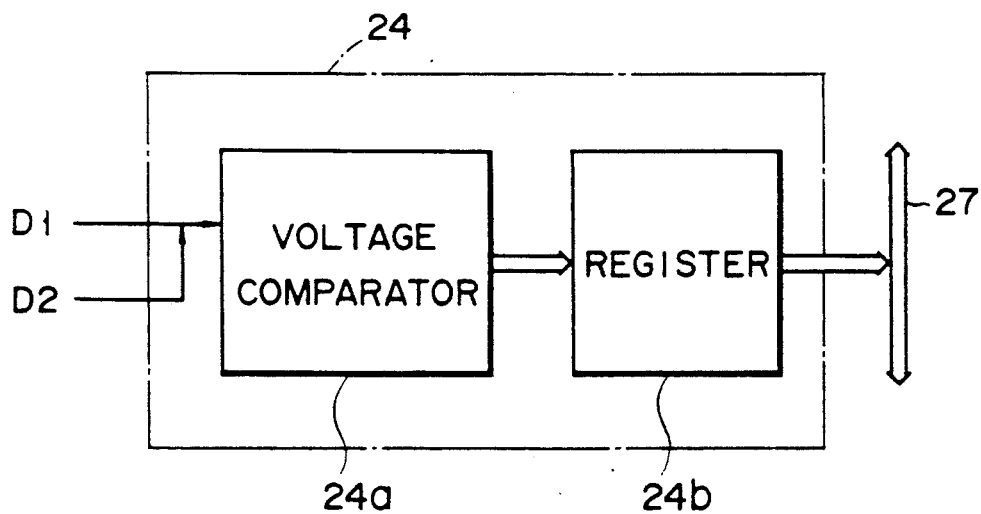
FIG. 3 is a block diagram showing a structure of another input port of the power source controller in accordance with the above embodiment of the present invention.

First input port 24 receives detection signals D1 and D2 respectively supplied from short-circuit detectors 11 and 12, converts them into short-circuit detection data, and puts out the data to internal bus 27. First input port 24 has as shown in FIG. 3 voltage comparator 24a and register 24b. Voltage comparator 24a converts supplied detection signal D1 or supplied detection signal D2 into short-circuit detection data and puts out the converted data into register 24b. Register 24b holds the short-circuit detection data and puts them out to internal bus 27.

Figure 2:
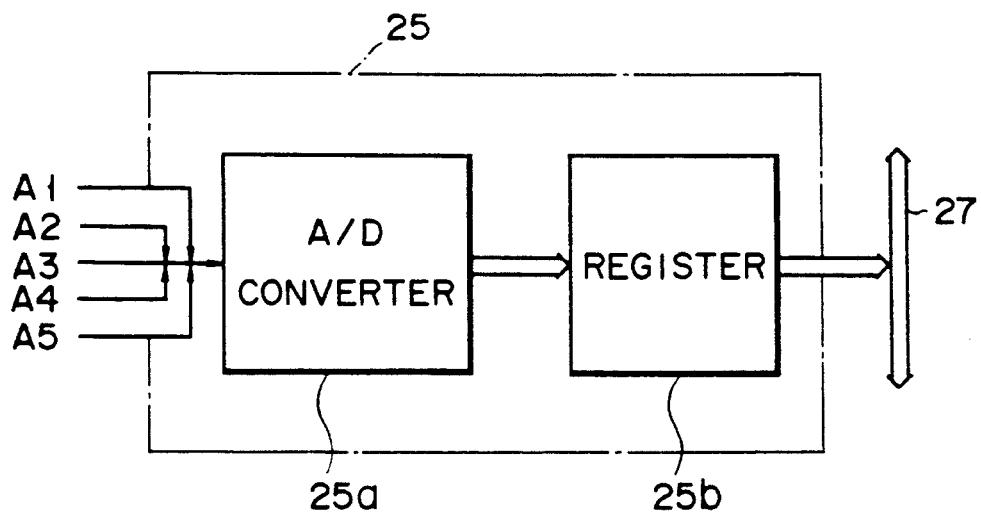
FIG. 2 is a block diagram showing a structure of an input port of a power source controller in accordance with the above embodiment of the present invention.

Second input port 25 receives detection signals A1 through A5 respectively supplied from voltage detectors 5, 6 and 10, current detector 7, and temperature sensor 13, and performs an analog/digital conversion process. Second input port 25 has analog/digital converter (A/D converter) 25a and register 25b, as shown in FIG. 2. A/D converter 25a converts detection signals A1 through A5, which are each supplied as an analog signal, into digital signals, and puts out the digital signals into register 25b. Register 25b holds the digital signals and puts then out to internal bus 27.

Figure 4:
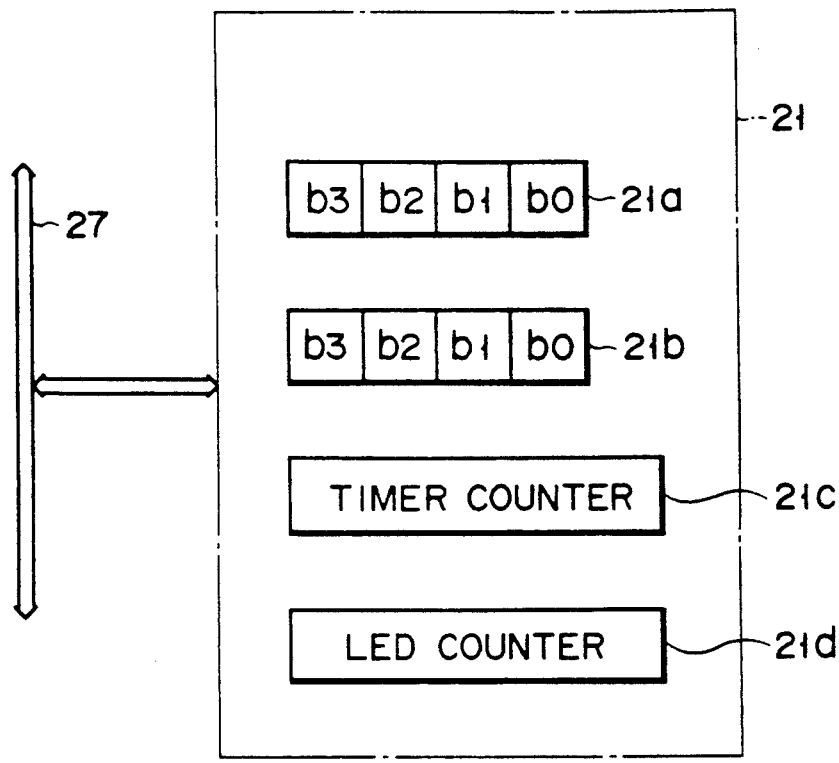
FIG. 4 is a block diagram showing a structure of a RAM in the power source controller in accordance with the above embodiment of the present invention.

RAN 21 stores data which are necessary for CPU 20 to perform a failure detection process. RAM 21 has error status register 21a, copying register 21b, timer counter register 21c, and LED counter register 21d, as shown in FIG. 4.

Error status register 21a stores error status data (four-bit data b3–b0) which are obtained by the failure detecting process performed by CPU 20 to indicate a kind to which the error condition (failure condition) of the power source circuit belongs. Copy register 21b stores a copy of the error status data stored in error status register 21a. Timer counter register 21c holds a timer count value obtained by CPU 20 counting clock pulses generated from timer 23. LED counter register 21d stores count values (CV) which are necessary for putting on or off the blinker device 14 comprising light emitting diodes (LEDs).

ROM 22 stores a program necessary for CPU 20 to perform the failure detection process, and a table comprising error condition kind data and error status data.

Figure 5:
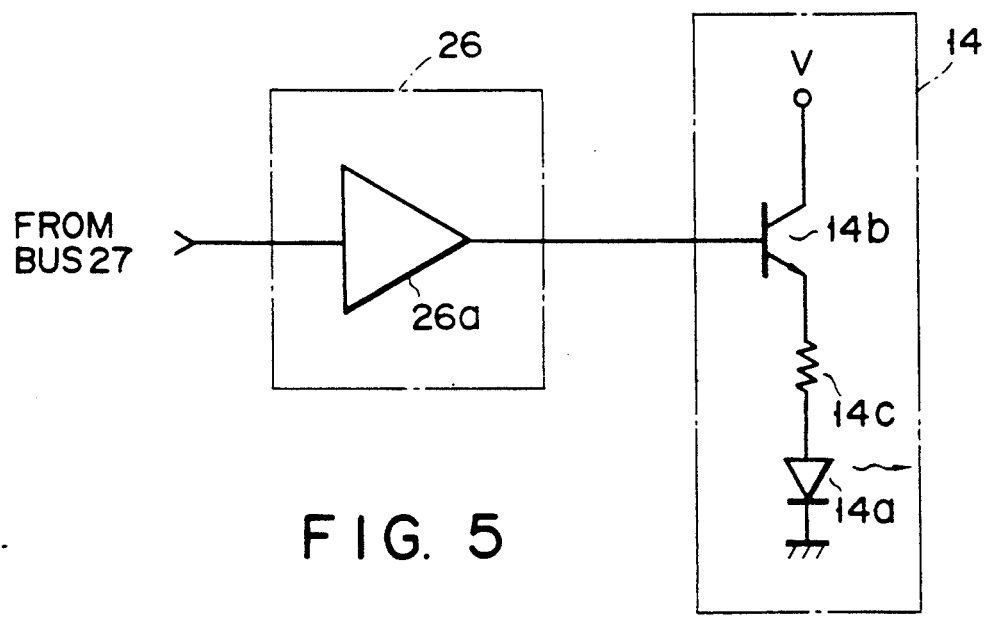
FIG. 5 is a block diagram showing a structure of an output port and a blinker device in accordance with the above embodiment of the present invention.

Blinker device 14 blinks in an orderly fashion that fits for the kind of error condition of the power source circuit which is obtained by a process of detecting the failure condition of the power source controller 4. Blinker device 14 comprises a circuit having LED 14a, transistor 14b, and resistor 14c, as shown in FIG. 5. Blinker device 14 operates as follows: When power source voltage V is applied to LED 14a due to the operation of transistor 14b, LED 14b emits light, whereas LED 14b stops emitting light when the application of the power source voltage V is shut off due to the operation of transistor 14b.

Transistor 14b in blinker device 14 is driven by a driving signal put out of output port 26 of power source controller 4. Output port 26 has driver 26a, as shown in FIG. 5. Output port 26 is controlled by CPU 20 through internal bus 27 and puts out its driving signal through driver 26a.

Figure 6:
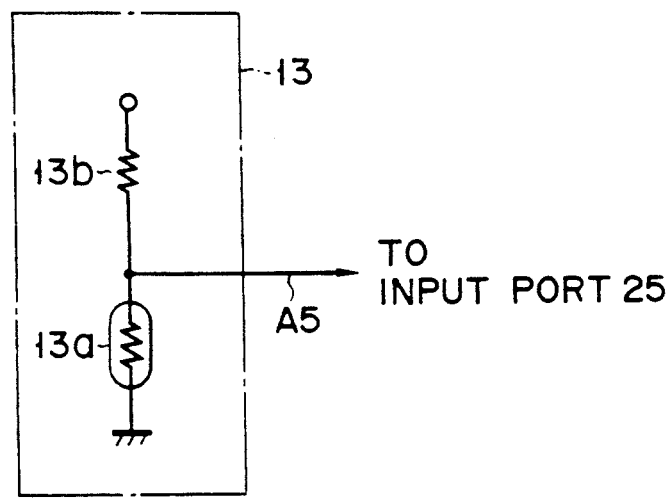
FIG. 6 is a circuit diagram showing a structure of a temperature sensor in accordance with the above embodiment of the present invention.

Temperature sensor 13 comprises, as shown in FIG. 6, thermistor 13a and resistor 13b, and supplies detection signal (a voltage level value) A5 corresponding to the ambient temperature to second input port 25.

Now, the operation of the above-mentioned embodiment will be explained below.

Power source controller 4 performs the failure detection process based on detection signals A1 through A5 and detection signals D1 and D2, all detection signals being supplied from the power source circuit, and generates error status data (data b3-b0) indicating the kind of failure condition of the power source circuit. The generated error status data are temporarily stored in error status register 21a.

A variety of error status data are previously prepared in accordance with various kinds of failure conditions, and are stored in ROM 22 as a table. When CPU 20 in power source controller 4 detects that the power source circuit is in a failure condition based on detection signals A1 through A5 and detection signals D1 and D2, it looks up from the table of ROM 22 error status data which corresponds to the kind of the error condition of the circuit. Then, CPU 20 stores the looked up error status data into error status register 21a.

Some examples of the correspondence relationship between error status data and kinds of error conditions will be shown below.

Error status data "0101" (detection signal A2) indicates that battery 2 is in a charge failure condition (a voltage failure). Data "0001" (detection signal A1) indicates that AC adapter 1 is in an output voltage failure condition. Data "0010" (detection signal A5) indicates that the power source circuit is in a temperature failure condition. Data "1000" (detection signal A3) indicates that battery 2 is in a charge failure condition (current failure). Data "0111" (detection signal A4) indicates that output terminal 3a of DC/DC converter 3 is in an output voltage failure condition. Data "1001" (detection signal D1) indicates that output terminal 3b of DC/DC converter 3 is short-circuited. Data "1010" (detection signal D2) indicates that output terminal 3c of DC/DC converter 3 is short-circuited. In this way, the total of fifteen kinds of error conditions can be indicated by four-bit error status data.

In the following explanation, a case that battery 2 is in a charge failure condition (a voltage failure condition) will be explained.

Voltage detector 6 is connected with output terminal 2a of battery 2, as shown in FIG. 1, and detects a voltage value of output terminal 2a. The voltage value of output terminal 2a indicates both an output voltage value of battery 2 and a charging voltage value from AC adapter 1.

Voltage detector 6 puts out to second input port 25 of power source controller 4 detection signal A2 which corresponds to the detection results or the voltage level value. Second input port 25 converts inputted detection signal A2 into a digital signal and stores it in register 25b (see FIG. 2).

CPU 20 receives from register 25b data corresponding to detection signal A2 and executes a power failure detection process. In detail, CPU 20 executes a program for the power failure detection process previously stored in ROM 22, and compares a previously set normal voltage level value with the voltage level value detected by voltage detector 6.

If the comparison result indicates that the detected voltage level value is outside of a permitted range, CPU 20 judges that a charge failure condition occurs at battery 2, and sets, to error status register 21a, error status data "0101" indicating that battery 2 is in a charge failure condition (voltage failure).

CPU 20 executes a blinker control process in which blinker 14 is driven for notifying the charge failure condition (voltage failure). The blinker control process has such contents as shown in a flow chart of FIG. 8 through FIG. 12.

Figure 8:
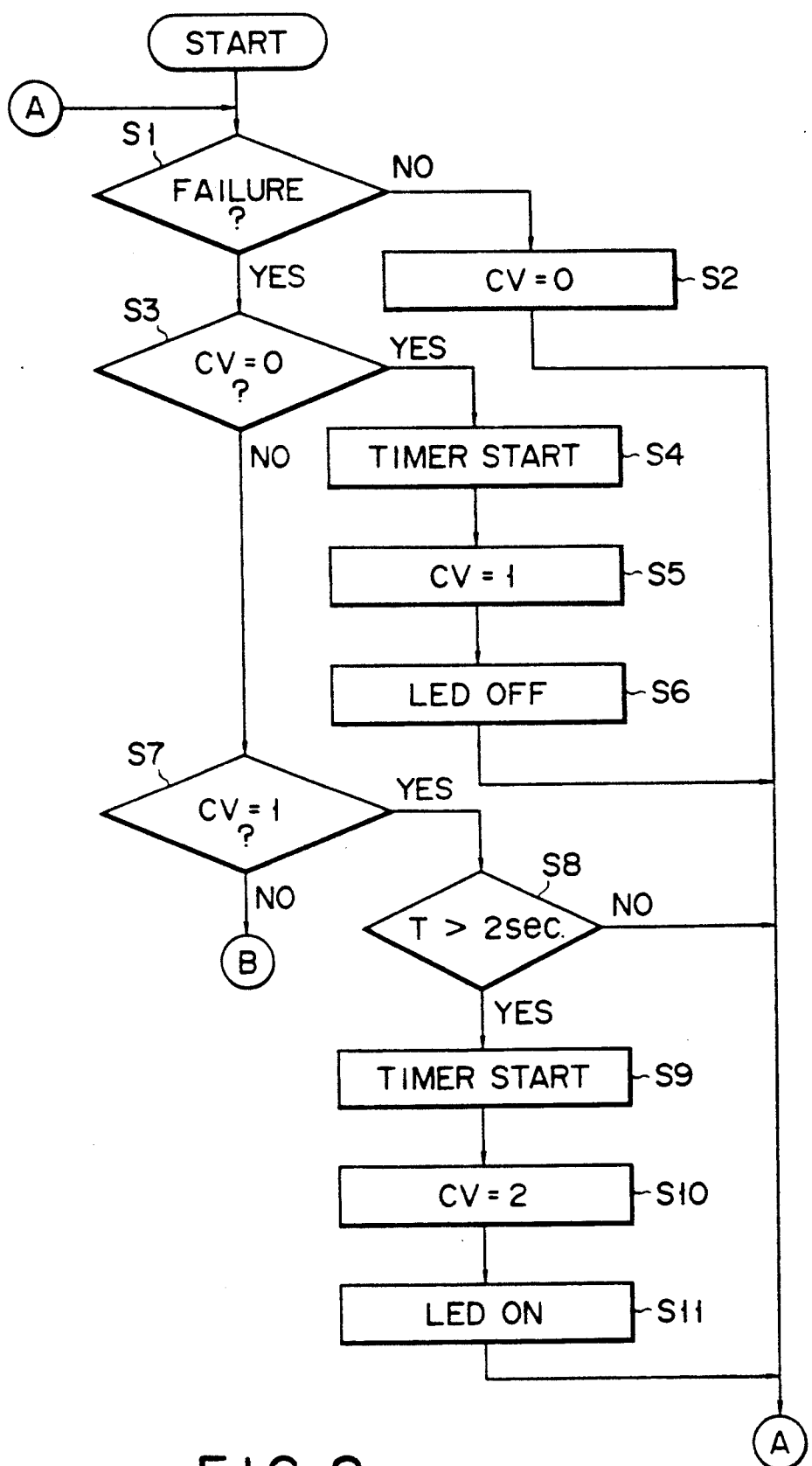
FIG. 8 through FIG. 12 are a flow chart for explaining operation of the above embodiment of the present invention.
Figure 9:
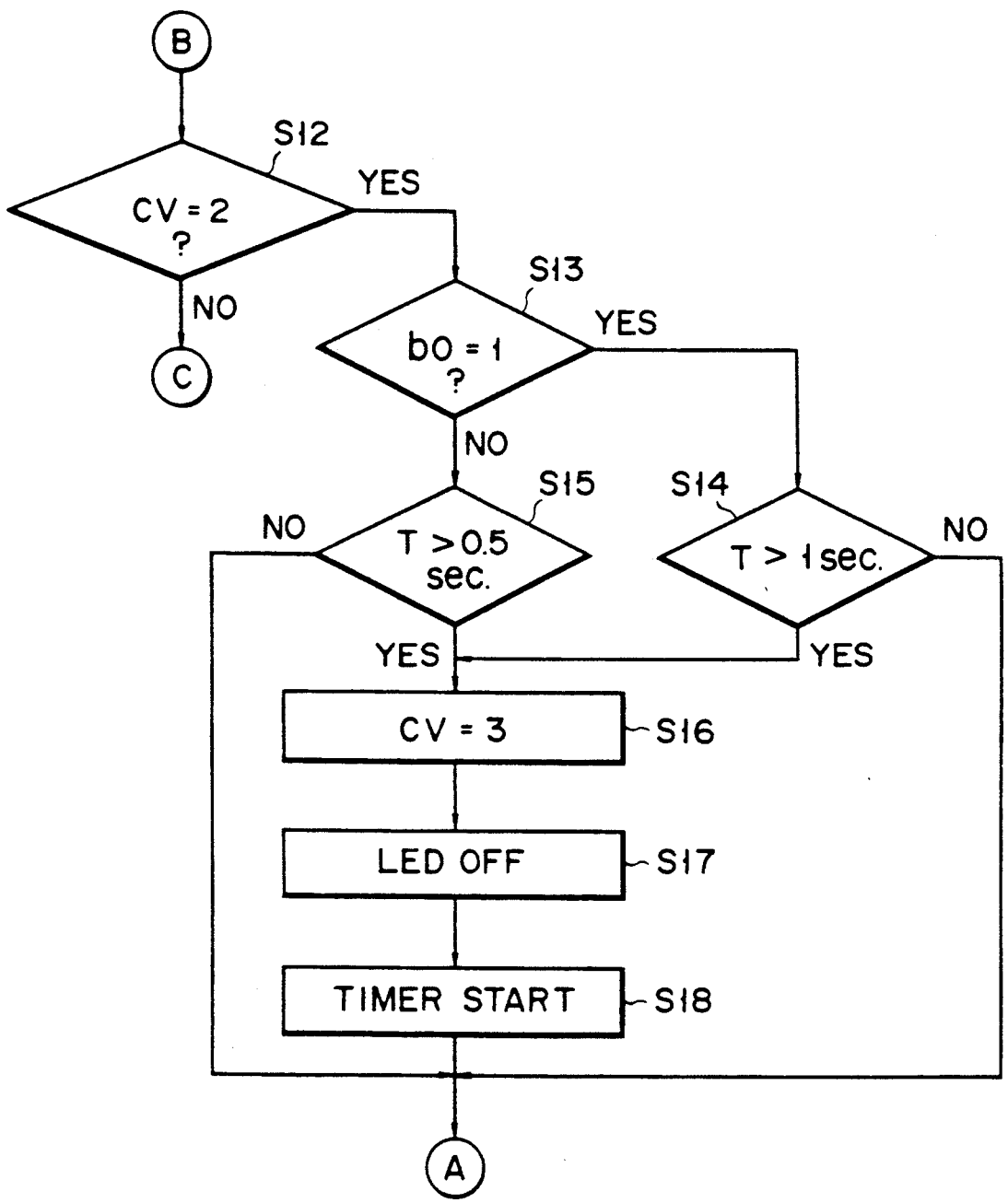
Figure 10:
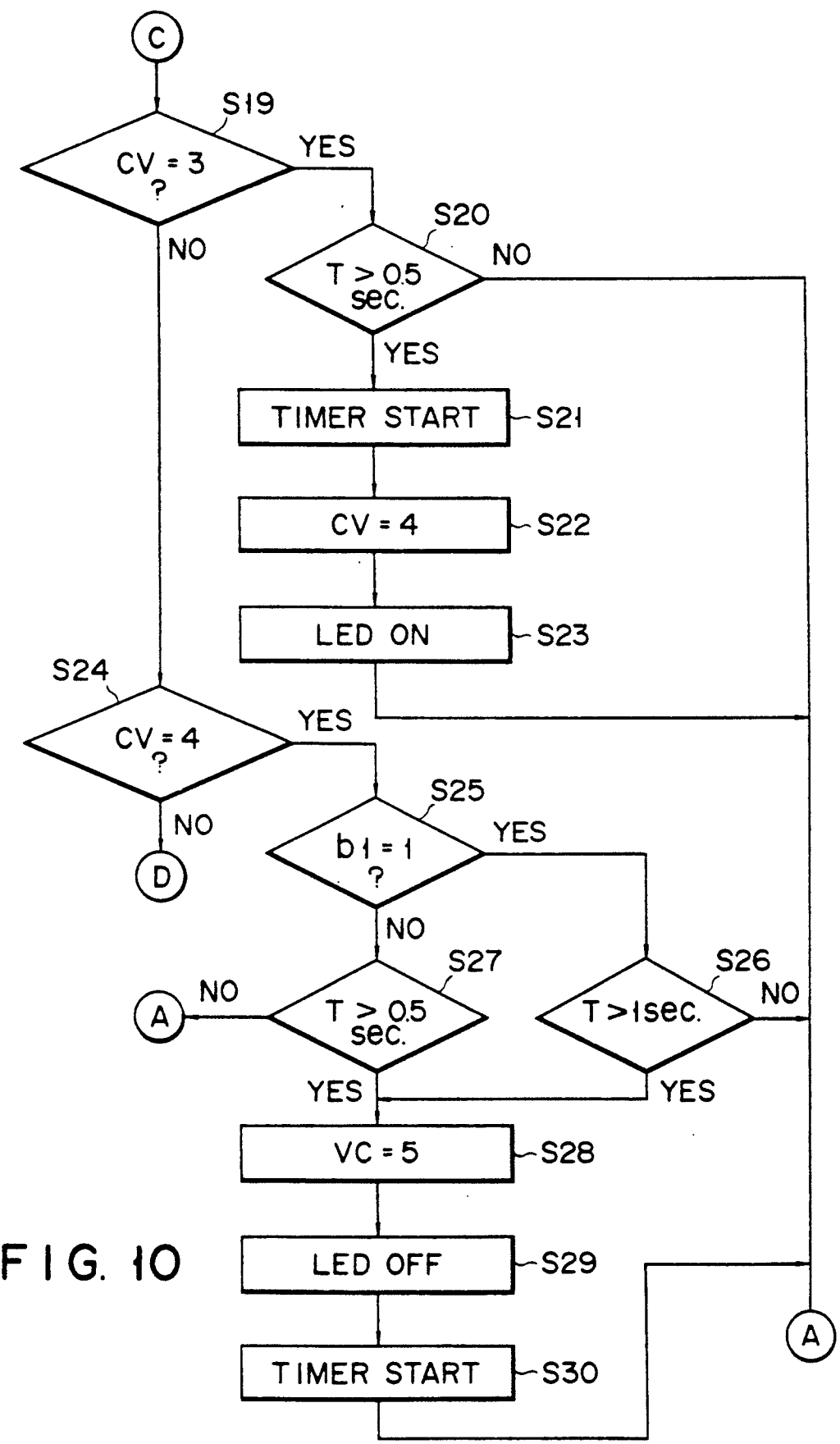
Figure 11:
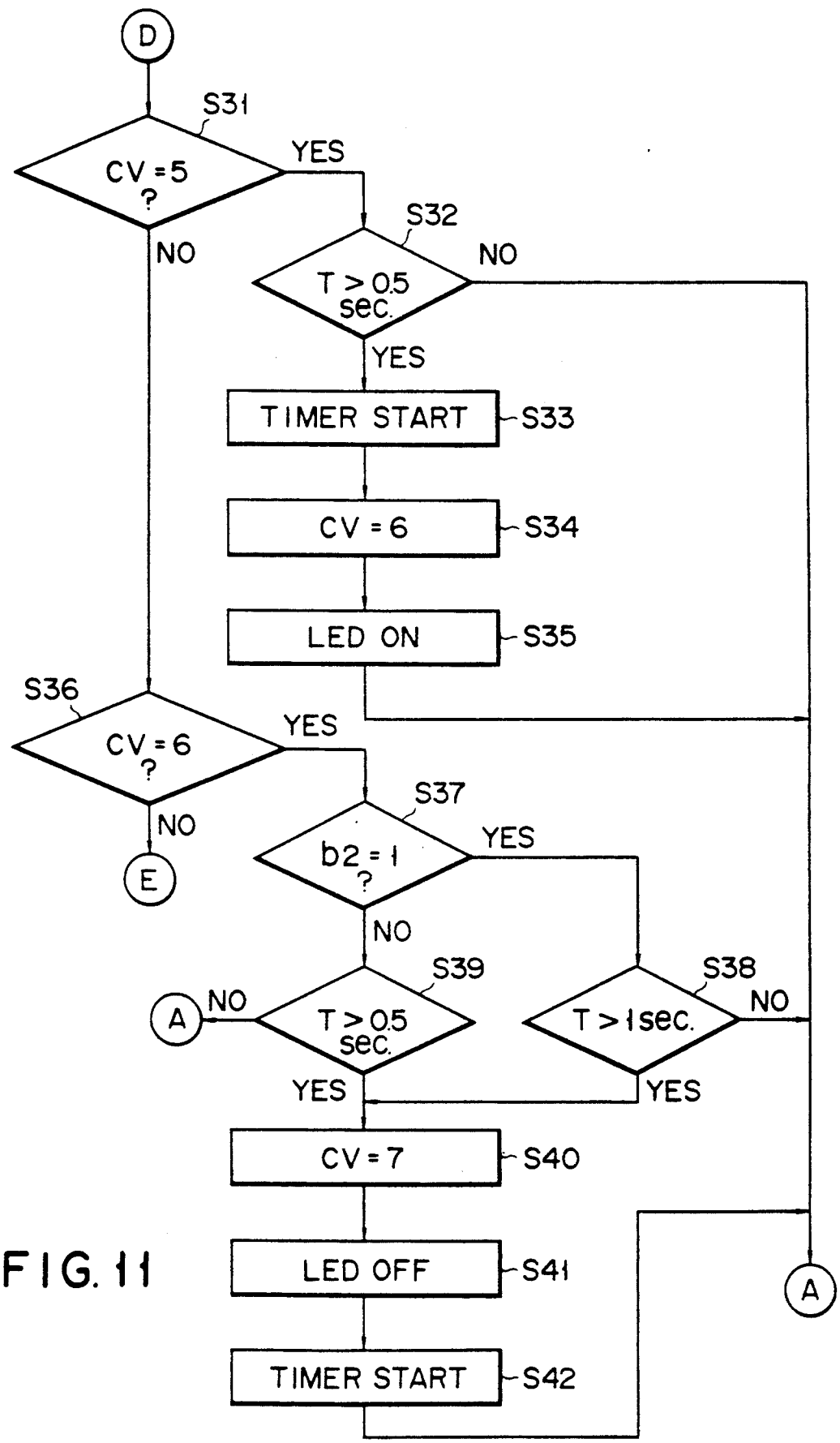
Figure 12:
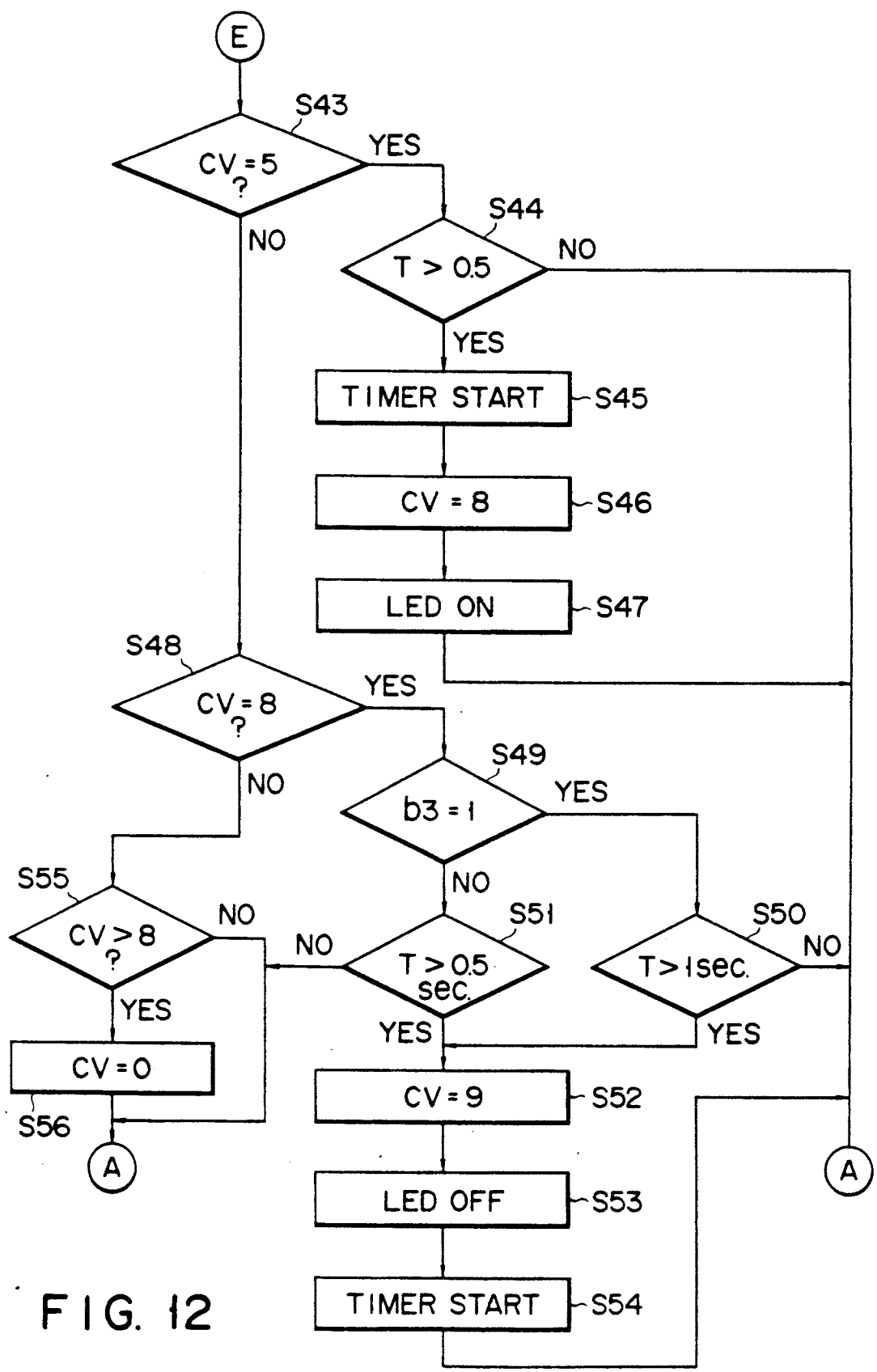

As shown in FIG. 8, CPU 20 resets LED counter register 21d and the count value (CV) is set to an initial value "0" (Step S2). After having set error status data "0101" to error status register 21a in accordance with the power failure detection process (YES in Step S1), CPU 20 judges whether count value CV of counter register 21d is "0" or not (Step S3). Since YES in this case, CPU 20 drives timer 23 (Step S4), and increments count value CV of counter register 21d to set it to "1" (Step S5). Timer 23 generates a clock pulse having a predetermined cycle (65 ms, for instance). CPU 20 counts the clock pulse from timer 23, and sets timer count value T to timer counter register 21. Therefore, timer count value T which is renewed each time a predetermined time has passed from a start of timer 23 is set to timer counter register 21.

Figure 7:
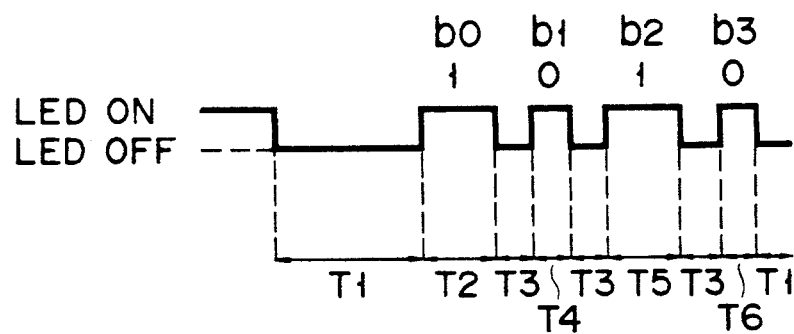
FIG. 7 is a timing chart for explaining operation of the above embodiment of the present invention.

CPU 20 controls driver 26a to turn off transistor 14b for the purpose of putting off LED 14a, as shown in FIG. 5 (Step S6). Namely, as shown in FIG. 7, a blinking operation begins in which LED turns off for a time T1 at an initial state. Time T1 is 2 seconds, for instance. CPU 20 repeats a loop consisting of YES in Step S1, NO in Step S3, YES in Step S7, and NO in Step S8.

After a condition that LED 14a is extinguished has passed for time T1 (YES in Step S8), CPU 20 drives timer 23 again (Step S9), and increments count value CV of counter register 21d to set it to "2" (Step S10). Therefore, timer count value T of timer counter register 21 begins at "0".

CPU 20 controls driver 26a to turn on transistor 14b for the purpose of putting on LED 14a (Step S11). Since count value CV of counter register 21d is set to "2,"CPU 20 moves to a process for judging first bit b0 of an error status data (Step S13). In this process, CPU 20 sets error status data "0101" to error status register 21a, and copies the set data to copy register 21b. CPU 20 shifts through copy register 21b, and judges bit by bit the entire data from first bit b0.

Since it is Judged from a judging operation of Step S13 that first bit b0 of the error status data is "1", CPU 20 controls to light up LED 14a for one second (Steps S11 through S14). Namely, as shown in FIG. 7, LED 14a is controlled to light up for time T2 which corresponds to one second.

When timer count value T becomes to indicate that one second has passed (YES in Step S14), CPU 20 increments count value CV of counter register 21d to set it to "3" (Step S16). CPU 20 further controls to extinguish LED 14a (Step S17), and drives timer 23 again (Step S18).

CPU 20 judges whether count value CV of counter register 21d is "3" or not (Step S19). Since it is YES in this case, CPU 20 controls to keep the extinct condition of LED 14a for 0.5 seconds (Step S20). Namely, as shown in FIG. 7, the extinct condition of LED 14a continues for time T3.

After the condition that LED 14a is extinguished continues for time T3 (YES in Step S20), CPU 20 drives timer 23 again (Step S21), and increments count value CV of counter register 21d to set it to "4" (Step S22). CPU 20 furthermore controls to light up LED 14a (Step S23).

Since count value CV of counter register 21d is set to "4", CPU 20 moves to a process for judging second bit b1 of the error status data (Step S25). Since it is found that second bit b1 of the error status data is "0", CPU 20 controls to light up LED 14a for 0.5 seconds (Step S23 through Step S27). Namely, as shown in FIG. 7, LED 14 is controlled to light up for time T4 corresponding to 0.5 seconds.

When timer count value T reaches 0.5 seconds (YES in Step S27), CPU 20 increments count value CV of counter register 21d to set it to "5" (Step S28). Furthermore, CPU 20 controls to extinguish LED 14a, and drives timer 23 again (Step 30).

CPU 20 judges whether count value CV of counter register 21d is "5" or not (Step S31). Since it is YES in this case, CPU 20 controls to continue the extinct condition of LED 14a for 0.5 seconds (Step S32). Namely, as shown in FIG. 7, extinction of LED 14a continues for time T3.

After the extinction of LED 14a continues for time T3 (YES in Step S32), CPU 20 drives timer 23 again (Step S33), and increment count value CV of counter register 21d to set it to "6" (Step S34). Furthermore CPU 20 controls to light up LED 14a (Step S35).

Since count value CV of counter register 21d is set to "6", CPU 20 moves to a process for judging third bit b2 of the error status data (Step S37). Since it is found out from the judgment process that third bit b2 of the error status data is "1", CPU 20 controls to light up LED 14a for one second (Step S35 through Step S38). Namely, as shown in FIG. 7, LED 14a is controlled to light up for time T5 corresponding to one second.

After timer count value T becomes one second (YES in Step S38), CPU 20 increments count value CV of counter register 21d to set it to "7" (Step S40). Furthermore, CPU 20 controls to extinguish LED 14a (Step S41), and drives timer 23 again (Step S42).

CPU 20 judges whether count value CV of counter register 21d is "7" or not (Step S43). Since it is YES in this case, CPU 20 controls to continue the extinguished condition of LED 14a for 0.5 seconds (Step S44). Namely, as shown in FIG. 7, the condition that LED 14a is extinct continues for time T3.

After the extinction of LED 14a has passed for time T3 (YES in Step S44), CPU 20 drives timer 23 again (Step S45), and increments count value CV of counter register 21d to set it to "8" (Step S46). Furthermore, CPU 20 controls to light up LED 14a ( Step S47 ).

Since count value CV of counter register 21d is set to "8", CPU 20 moves to a process for judging fourth bit b3 of the error status data (Step S49). Since it is found out from this judgment process that fourth bit b3 of the error status data is "0", CPU 20 controls to light up LED 14a for 0.5 seconds (Step S47 through Step S49, and Step S51). Namely, as shown in FIG. 7, LED 14a is controlled to light up for time T6 which corresponds to 0.5 seconds.

After timer count value T has reached 0.5 seconds (YES in Step S51), CPU 20 increments count value CV of counter register 21d to set it to "9" (Step S52). Furthermore, CPU 20 controls to extinguish LED 14a ( Step S53), and drives timer 23 again (Step S54).

CPU 20 judges whether count value CV of counter register 21d is "8" or not (Step S48). Since it is NO in this case, CPU 20 judges whether count value CV is bigger than "8" or not (Step S55). Since count value CV is "9" (YES in Step S55), CPU 20 sets count value CV to an initial value "0" (Step S56).

In this way, power source controller 4 detects that battery 2 of the power source circuit is in a power failure condition (power failure), and sets to register 21a an error status data "0101" which corresponds to a kind of power failure condition. Based on the error status data "0101", the power source controller controls to light up and extinguish blinker 14 (LED 14a) for the purpose of notifying a charge failure condition.

Namely, as shown in FIG. 7, LED is on-off controlled corresponding to a value of each bit in the error status data "0101". In case of a charge failure condition, the condition that the LED is light up for one second and then is extinguished for 0.5 seconds is repeated. The user sees the blinking condition of blinker 14, and understands that a charge failure condition (voltage failure) occurs at battery 2 of the power source circuit.

In the above embodiment, "1" in each bit of the four bits stands for lighting up or extinguishing the LED for one second and "0" in each bit stands for lighting up or extinguishing the LED for 0.5 seconds. However, it is not restricted to this example. For instance, it is possible to light up or extinguish the LED for one second when each bit is "0", and to light up or extinguish the LED for 0.5 seconds when each bit is "1". In addition, the error status data in the above embodiment has four bits, but it is possible that the error status data has more than four bits. The number of bits in the error status data determines the number of kinds of failure conditions which the device can notify.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power controlling apparatus with a power failure detecting function comprising:

detecting means for detecting a power failure condition of a power source circuit and putting out a failure detection signal;

failure data processing means, having an input means for receiving the failure detection signal from the detecting means, identifying the failure condition of the power source circuit based on the failure detection signal received at the input means, generating a failure status data corresponding to the kind of the failure condition, and having a register means for storing the failure status data;

blinker means for emitting light at intervals in which on/off durations correspond to the kind of the failure condition;

blinker control means, having an LED counter for holding an LED count value obtained by counting a number of bits of the failure status data and a timer counter for setting an on/off duration for the blinker means, for lighting up the blinker means for every bit of the failure status data based on the LED count value of the LED counter, and controlling to set a lighting duration of the blinker means in accordance with each bit data based on the timer count value of the timer counter.

2. A power controlling apparatus with a power failure detecting function comprising:

detecting means for detecting a power failure condition of a power source circuit and outputting a failure detection signal;

failure data processing means for identifying the power failure condition of the power source circuit based on the failure detection signal supplied from the detecting means, and generating failure status data in correspondence with a kind to which the identified power failure condition belongs, the failure data processing means including a register having previously prepared number of bits, and setting bit data at each bit position of the register in accordance with the kind of the failure condition; and blinker means for blinking in a variety of fashions in correspondence with various kinds of power failure conditions based on the failure status data generated by the failure data processing means, the blinker means including a light emitting diode, and driving means for lighting up and extinguishing the light emitting diode based on the failure status data.

3. A power controlling apparatus with a power failure detecting function comprising:

detecting means for detecting a power failure condition of a power source circuit and putting out a failure detection signal;

failure data processing means, having an input means for receiving the failure detection signal from the detecting means, identifying the failure condition of the power source circuit based on the failure detection signal received at the input means, generating a failure status data corresponding to the kind of the failure condition, and having a register means for storing the failure status data;

blinker means for emitting light at intervals in which on/off durations correspond to the kind of the failure condition;

blinker control means, having a timer counter for setting an on/off duration for the blinker means, for lighting up the blinker means for every bit of the failure status data, and controlling to set a lighting duration of the blinker means in accordance with each bit data based on the timer count value of the timer counter.

4. An electric appliance with a power failure detecting function comprising:

detecting means for detecting a power failure condition of a power source circuit and putting out a failure detection signal;

failure data processing means, having an input means for receiving the failure detection signal from the detecting means, identifying the failure condition of the power source circuit based on the failure detection signal received at the input means, generating a failure status data corresponding to the kind of the failure condition, and having a register means for storing the failure status data;

blinker means for emitting light at intervals in which on/off durations correspond to the kind of the failure condition;

blinker control means, having an LED counter for holding an LED count value obtained by counting a number of bits of the failure status data and a timer counter for setting an on/off duration for the blinker means, for lighting up the blinker means for every bit of the failure status data based on the LED count value of the LED counter, and controlling to set a lighting duration of the blinker means in accordance with each bit data based on the timer count value of the timer counter.

5. An electric appliance with a power failure detecting function comprising:

detecting means for detecting a power failure condition of a power source circuit and putting out a failure detection signal;

failure data processing means for identifying the power failure condition of the power source circuit based on the failure detection signal supplied from the detecting means, and generating failure status data in correspondence with a kind to which the identified power failure condition belongs, the failure data processing means including a register having previously prepared number of bits, and setting bit data at each bit position of the register in accordance with the kind of the failure condition; and blinker means for blinking in a variety of fashions in correspondence with various kinds of power failure conditions based on the failure status data generated by the failure data processing means, the blinker means including a light emitting diode, and driving means for lighting up and extinguishing the light emitting diode based on the failure status data.

6. An electric appliance with a failure detecting function comprising:

detecting means for detecting a failure condition of an electric appliance and putting out a failure detection signal;

failure data processing means, having an input means for receiving the failure detection signal from the detecting means, identifying the failure condition of the electric appliance based on the failure detection signal received at the input means, generating a failure status data corresponding to the kind of the failure condition, and having a register means for storing the failure status data;

blinker means for emitting light at intervals in which on/off durations correspond to the kind of the failure condition;

blinker control means, having an LED counter for holding an LED count value obtained by counting a number of bits of the failure status data and a timer counter for setting an on/off duration for the blinker means, for lighting up the blinker means for every bit of the failure status data based on the LED count value of the LED counter, and controlling to set a lighting duration of the blinker means in accordance with each bit data based on the timer count value of the timer counter.

7. An electric appliance with a failure detecting function comprising:

detecting means for detecting a failure condition of an electric appliance and outputting a failure detection signal;

failure data processing means for identifying the failure condition of the electric appliance based on the failure detection signal supplied from the detecting means, and generating failure status data in correspondence with a kind to which the identified failure condition belongs, the failure data processing means including a register having previously prepared number of bits, and setting bit data at each bit position of the register in accordance with the kind of the failure condition; and blinker means for blinking in a variety of fashions in correspondence with various kinds of failure conditions based on the failure status data generated by the failure data processing means, the blinker means including a light emitting diode, and driving means for lighting up and extinguishing the light emitting diode based on the failure status data.

* * * * *